United States Patent
Lee et al.

(10) Patent No.: US 9,940,276 B2
(45) Date of Patent: Apr. 10, 2018

(54) PLC SYSTEM HAVING A PLURALITY OF CPU MODULES AND CONTROL METHOD THEREOF

(71) Applicant: LSIS CO., LTD., Anyang-si, Gyeonggi-do (KR)

(72) Inventors: Soo Gang Lee, Anyang-si (KR); Dae Hyun Kwon, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 236 days.

(21) Appl. No.: 14/681,966

(22) Filed: Apr. 8, 2015

(65) Prior Publication Data

US 2015/0293866 A1 Oct. 15, 2015

(30) Foreign Application Priority Data

Apr. 15, 2014 (KR) .................. 10-2014-0044648

(51) Int. Cl.
  *G05B 19/05* (2006.01)
  *G06F 13/372* (2006.01)
  *G06F 1/12* (2006.01)

(52) U.S. Cl.
  CPC ......... *G06F 13/372* (2013.01); *G05B 19/052* (2013.01); *G06F 1/12* (2013.01); *G05B 2219/1212* (2013.01)

(58) Field of Classification Search
  CPC .................................................. G06F 13/372
  See application file for complete search history.

(56) References Cited

U.S. PATENT DOCUMENTS

| 6,141,769 | A | * | 10/2000 | Petivan | G06F 11/165 |
| | | | | | 714/10 |
| 2003/0161391 | A1 | * | 8/2003 | Andre | G06F 13/385 |
| | | | | | 375/219 |
| 2008/0080566 | A1 | * | 4/2008 | Arumugham | G06F 1/12 |
| | | | | | 370/503 |
| 2010/0070666 | A1 | * | 3/2010 | Brindle | H04L 12/417 |
| | | | | | 710/117 |
| 2011/0208885 | A1 | * | 8/2011 | Kwek | G06F 13/4072 |
| | | | | | 710/107 |

FOREIGN PATENT DOCUMENTS

| CN | 1417983 | 5/2003 |
| CN | 1784325 | 6/2006 |
| CN | 101346698 | 1/2009 |

(Continued)

OTHER PUBLICATIONS

Siemens, "Simatic S5-135U/155U System Manual—Release 06," XP055210252, Dec. 1998, 560 pages.

(Continued)

*Primary Examiner* — Kim Huynh
*Assistant Examiner* — Kevin Stewart
(74) *Attorney, Agent, or Firm* — K&L Gates LLP (57) ABSTRACT

Disclosed is a PLC system having a plurality of CPU modules and a control method thereof, wherein the method includes ascertaining a clock signal when a count is a count corresponding to a time slot allocated by a master CPU module, generating a clock signal by accessing to a backplane, and ending generation of clock signal at a time when the access to the backplane ends.

11 Claims, 4 Drawing Sheets

(56) References Cited

FOREIGN PATENT DOCUMENTS

| | | |
|---|---|---|
| CN | 103116564 | 5/2013 |
| CN | 103261983 | 8/2013 |
| GB | 2288518 | 10/1995 |
| JP | 54-146506 | 11/1979 |
| JP | 02-83601 | 3/1990 |
| JP | 2012-108696 | 6/2012 |
| WO | 2010000200 | 1/2010 |
| WO | 12/169037 | 12/2012 |

OTHER PUBLICATIONS

European Patent Office Application Serial No. 15163449.0, Search Report dated Sep. 7, 2015, 9 pages.
Japan Patent Office Application Serial No. 2015-083356, Office Action dated Mar. 8, 2016, 2 pages.
State Intellectual Property Office of the People's Republic of China Application Serial No. 201510277850.0, Office Action dated May 8, 2017, 7 pages.

\* cited by examiner

PLC SYSTEM HAVING A PLURALITY OF CPU MODULES AND CONTROL METHOD THEREOF

CROSS REFERENCE TO RELATED TO APPLICATIONS

Pursuant to 35 U.S.C. § 119 (a), this application claims the benefit of earlier filing date and right of priority to Korean Patent Application No. 10-2014-0044648, filed on Apr. 15, 2014, the contents of which are all hereby incorporated by reference herein in its entirety.

TECHNICAL FIELD

The present disclosure relates to a PLC system having a plurality of CPU modules and a control method thereof.

BACKGROUND ART

In general, communication is realized through a parallel circuit known as a backplane for each module in a PLC (Programmable Logic Controller) used in an FA (Factory Automation). That is, a backplane is used to communicate from one module to another module, where a module requesting a communication must obtain a control right over the backplane. When several modules try to access to a backplane with no control right, a signal confliction is generated to disable a normal access.

In general, in a communication between a master module requesting a communication and a slave module responding to the request of the master module, a control right over a common resource issues a token according to a predetermined rule, and although access methods are same when a predetermined master possesses a token (i.e., having a control right), it is difficult to realize a satisfactory performance in real time control, because a time for exchanging tokens and a time for processing the tokens are required according to a predetermined rule for determining a token ownership.

Figure 1:
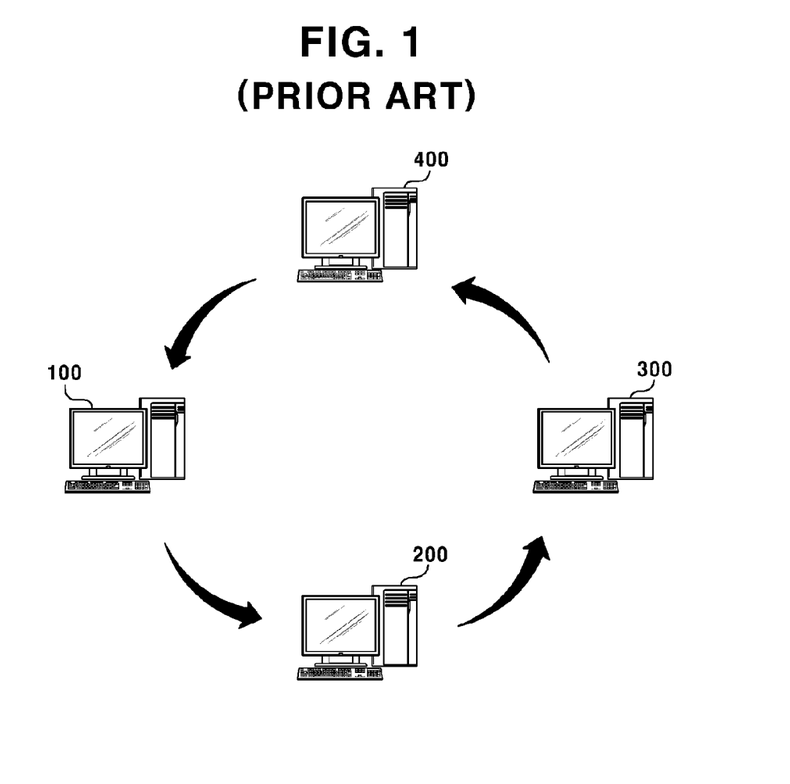
FIG. 1 is a schematic view illustrating an exemplary method for obtaining a token-based control right according to a conventional multi-master system.

FIG. 1 is a schematic view illustrating an exemplary method for obtaining a token-based control right according to a conventional multi-master system.

Referring to FIG. 1, a plurality of masters (100~400) may possess a control right called a token in a round robin method. The master possessing the token has an authority to access to a backplane, and can access to a slave module through the backplane. That is, when there is a need for a master to control a slave, the master checks if it has a token, and accesses to the slave through a backplane if it has the token, and when the master fails to have a token, and the master cannot access to the slave but has to wait. The master can access to the slave once it has a token, and may transfer the token to other masters according to a predetermined algorithm.

Although FIG. 1 has illustrated a round-robin method, it is possible to receive and transfer the token in other various methods according to a predetermined rule by a performer. However, this method has a limit in performance in real time, because it requires a token control algorithm and token receipt/transmission process time.

Figure 2:
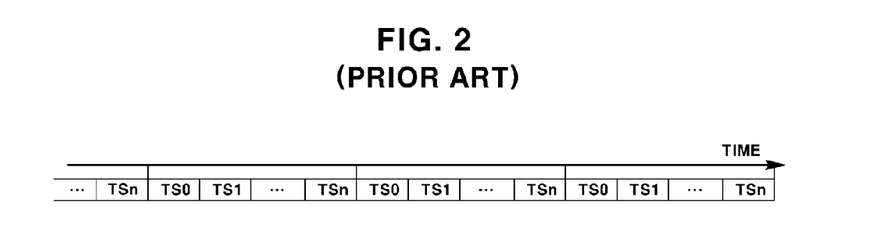
FIG. 2 is a schematic view illustrating an exemplary method for obtaining a control right according to a time slot in a conventional multi-master system.

FIG. 2 is a schematic view illustrating an exemplary method for obtaining a control right according to a time slot in a conventional multi-master system, where the system is available with n number of masters.

Referring to FIG. 2, a continuous time is divided by time slot using the number of masters or more than the number of masters, where the master can access to a backplane only within a time allocated thereto.

When there is a need to control a slave, a master operates in a manner such that the master first checks if it is a time slot allocated to itself and starts to access the backplane, and the master waits during time slot not allocated to itself, or re-tries after a predetermined period of time.

This method has an advantageous effect in that a processing time can be reduced because there is no direct exchange of tokens but there is a possibility of collision because accesses may be simultaneously tried by time measurement error of each master. That is, a plurality of master systems is driven by respective clocks, and when there is generated a time error on the clocks, there is a possibility of collision due to clock error on same time.

DISCLOSURE

Technical Problem

The present disclosure has been made to solve the foregoing disadvantages/problems of the prior art and therefore an object of certain embodiments of the present invention is to provide a PLC system having a plurality of CPUs configured to obtain a backplane control right for accessing to a slave module in real time, and a control method thereof.

Technical Solution

In one general aspect of the present disclosure, there is provided a PLC system comprising:
a first CPU module configured to determine a time slot allocated for indicating a count accessible to a backplane, and to access to the backplane at the allocated time slot; and
a plurality of second CPU modules respectively accessing to the backplane at the time slot allocated by the first CPU module, wherein
the first CPU module and the plurality of the second CPU modules generate a clock signal when accessed to the backplane, and each of the first CPU module and the plurality of the second CPU modules includes a detector configured to detect a clock signal generated by the first CPU module and the plurality of the second CPU modules accessed to the backplane.

Preferably, but not necessarily, the first CPU module and the plurality of the second CPU modules trying to access to the backplane does not access to the backplane when a clock signal is detected by the detector.

Preferably, but not necessarily, the first CPU module synchronizes counts of time slot with a start count when the first CPU module and the plurality of the second CPU modules accessed to the backplane stops generating a clock signal.

Preferably, but not necessarily, the first CPU module determines the time slot in consideration of the number and attributes of the first CPU module and the plurality of second CPU modules.

Preferably, but not necessarily, the first CPU module transmits a time slot maximum count, a time slot current count, a time slot start count and a time slot end count to the plurality of second CPU modules.

In another general aspect of the present disclosure, there is provided a control method of PLC system having a plurality of CPU modules, the method comprising:
determining a time slot allocated for indicating a count accessible to the backplane;

ascertaining a clock signal when the count is a count corresponding to an allocated time slot;

accessing to the backplane; and synchronizing counts at a time when the access to the backplane ends.

Preferably, but not necessarily, the method may further comprise not accessing to the backplane when a clock signal is detected at a count corresponding to the allocated time slot.

Preferably, but not necessarily, the method may further comprise waiting for accessing to the backplane at a time slot of next count.

Preferably, but not necessarily, the method may further comprise generating a clock signal at a time of accessing to the backplane.

Preferably, but not necessarily, the method may further comprise ending generation of clock signal at a time when the access to the backplane ends.

Preferably, but not necessarily, the time slot may be determined in consideration of the number and attributes of the plurality of CPU modules connected to the backplane.

In still another general aspect of the present disclosure, there is provided a control method of PLC system having a plurality of CPUs, the method comprising:

ascertaining a clock signal when a count is a count corresponding to a time slot allocated by a master CPU module of the plurality of CPU modules;

accessing to a backplane and generating a clock signal by the plurality of CPU modules; and ending generation of clock signal at a time when the access to the backplane ends by the plurality of CPU modules.

Preferably, but not necessarily, the method may further comprise not accessing to the backplane when a clock signal is detected at a count corresponding to the allocated time slot.

Preferably, but not necessarily, the method may further comprise waiting for accessing to the backplane at a time slot of next count.

Preferably, but not necessarily, the method may further comprise synchronizing, by the master CPU module, the count at a time of ending generation of clock signal.

Advantageous Effects

The exemplary embodiments of the present disclosure have advantageous effects in that collision can be avoided by ascertaining (checking or confirming) whether other CPU modules are connected even if corresponding to a time slot of CPU module itself, and a master CPU module synchronizes counts at a time of ending, by a certain CPU module, an access to a slave module to thereby reduce a standby time for access.

BEST MODE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, explanation will be given to obtainment of control right according to a conventional multi-master system, and then to the exemplary embodiments of the present disclosure with reference to the accompanying drawings.

Figure 3:
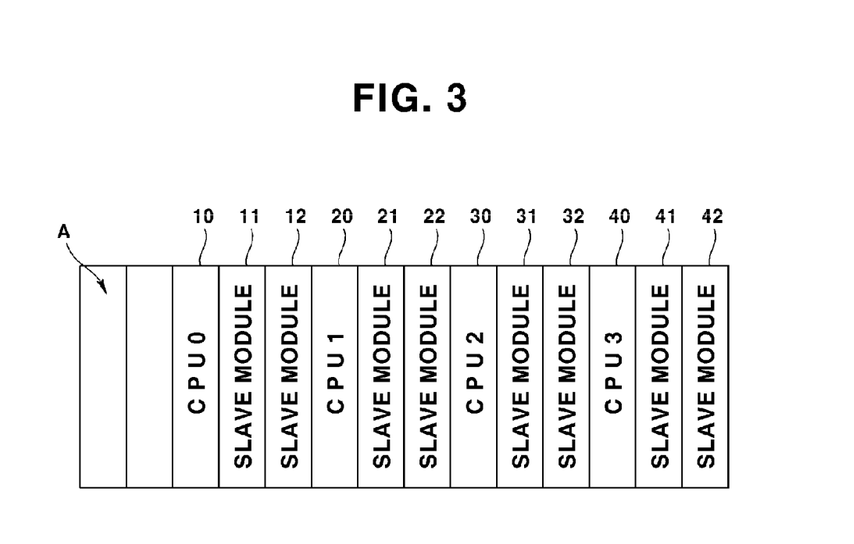
FIG. 3 is a schematic view illustrating a PLC system according to the present disclosure.
Figure 4:
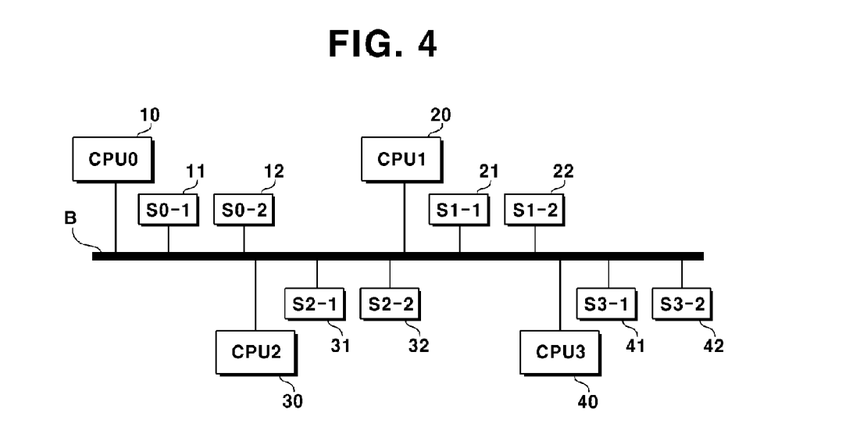
FIG. 4 is a schematic block diagram illustrating connectivity in FIG. 3.

FIG. 3 is a schematic view illustrating a PLC system according to the present disclosure, and FIG. 4 is a schematic block diagram illustrating connectivity in FIG. 3.

Referring to FIG. 3, a PLC system according to an exemplary embodiment of the present disclosure may include a plurality of slots (A), where a plurality of CPU (Central Processing Units) modules (10, 20, 30, 40) may be allocated to a predetermined slot, and a plurality of slave modules controlled by the plurality of CPU modules (10, 20, 30, 40) may be allocated to a slot near to each of the plurality of CPU modules (10, 20, 30, 40).

At this time, the slave module may include various modules inclusive of a communication module, an input/output module and a counter module, for example, and it should be apparent that the present disclosure is not limited by types of slave modules.

That is, slave modules (11, 12) of a relevant CPU0 module (10) may be allocated to a slot near to the CPU module 0 (10), and respective slave modules may be also allocated to other CPU modules (20, 30, 40). Although the exemplary embodiment of the present disclosure has illustrated a case where two slave modules corresponding to one CPU module are exemplified, the present disclosure is not limited thereto, and it should be apparent to the skilled in the art that types and number of slave modules may be determined as needs require.

Hereinafter, for convenience sake, the 'CPU module 0 (10)' will be designated as 'CPU0' as illustrated in the drawings, and slave modules of CPU0 (10) will be designated as S0_1 (11) and S0_2 (12). Likewise, slave modules of CPU1 (20) will be designated as S1_1 (21) and S1_2 (22), slave modules of CPU2 (30) will be designated as S2_1 (31) and S2_2 (32), and slave modules of CPU3 (40) will be designated as S3_1 (41) and S3_2 (42). Furthermore, the CPU0 (10) will Designated as a master CPU module configured to control an entire PLC system, and other CPU1, CPU2 and CPU3 (20, 30, 40) will be designated as bus master CPU modules. However, it should be apparent that the present disclosure is not limited to the above designation.

As noted from the foregoing, modules allocated to within a plurality of slots (A) of one PLC system are connected to a backplane, the configuration of which is illustrated in FIG. 4 which in turn mimetically illustrates an example of FIG. 3.

That is, it can be learned that each of CPU0 (10), SO_1 (11), SO_2 (12), CPU1 (20), S1_1 (21), S1_2 (22), CPU2 (30), S2_1 (31), S2_2 (32), CPU3 (40), S3_1 (41) and S3_2 (42) are all connected through a backplane (B).

In the above PLC system, the master CPU module which is CPU0 (10) allocates time slots in response to a predetermined time in order to control a plurality of CPU modules, where each CPU module does not unconditionally access to a slave module through the backplane (B) even if being corresponded to its time slot, the CPU module accesses to a slave module through the backplane (B) by avoiding collision using a method of ascertaining whether access is made by other CPU modules during time slot, and fundamental collision can be avoided by synchronizing, by a master CPU module, counts of time slot based on a time when the access of each CPU module ends, a detailed description thereto will be provided hereinafter.

In the description of the present disclosure, it should be mentioned that a meaning of 'access to slave module through backplane (B)' is same as that of 'access to slave module through backplane (A)'.

When an electric power is applied to a PLC system illustrated in FIGS. 3 and 4, the CPU0 (10) may ascertain (check or confirm) the number of CPU modules present within a PLC system and determine a time slot and transmit the determination to the CPU1, CPU2 and CPU3 (20, 30, 40). At this time, the time slot may be determined in consideration of the number of CPU modules and attributes of relevant CPU modules, whereby a length of time slot allocated to each CPU module may be same or different.

Figure 5:
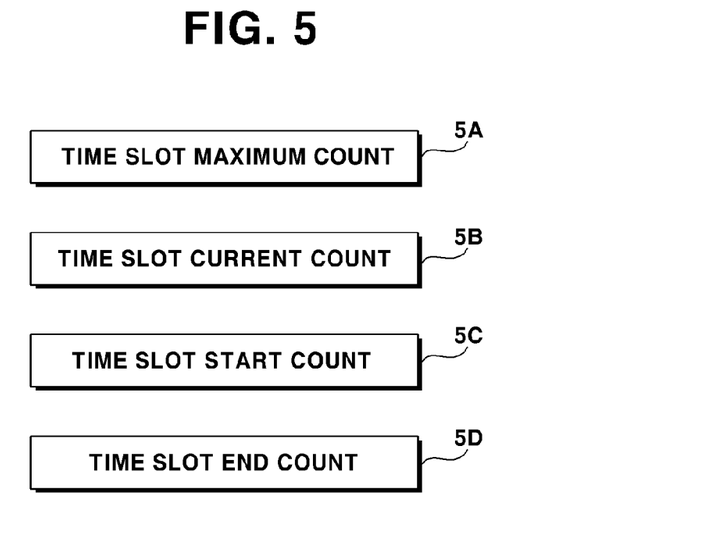
FIG. 5 is a schematic block view illustrating parameters transmitted to CPU1, CPU2 and CPU3 by being generated by CPU0 of FIG. 3 according to an exemplary embodiment of the present disclosure.

FIG. 5 is a schematic block view illustrating parameters transmitted to CPU1, CPU2 and CPU3 by being generated by CPU0 of FIG. 3 according to an exemplary embodiment of the present disclosure.

Referring to FIG. 5, the parameter of the present disclosure may include a time slot maximum count (5A), a time slot current count (5B), a time slot start count (5C), and a time slot end count (5D).

The time slot maximum count (5A) may be set equal to or greater than a size in which sizes of time slots allocated to each CPU module are added. The time slot current count (5B) may be a free running from zero (0) to a time slot maximum count, where the CPU0 (10) may be synchronized to zero (0) at a time when access to respective slave modules of each CPU module ends, whereby all the CPU modules are same at the moment of zero. The time slot start count (5C) is a time of time slot accessible, by each CPU module, to the backplane (B), and the time slot end count (5D) indicates an end of time slot accessible, by each CPU module, to the backplane (B).

That is, the CPU0 (10) may ascertain the number and attributes of the CPU modules (10~40) accessed to the backplane (B) when the PLC system is turned on or reset, to set a time slot accessible by each CPU modules (10~40), to set the time slot maximum count (5A), and to set the time slot start count (5C), and the time slot end count (5D).

Successively, the CPU0 (10) may transmit the time slot maximum count (5A), the time slot current count (5B), the time slot start count (5C), and the time slot end count (5D) to other CPU modules (10~40). The time slot maximum count (5A) and the time slot current count (5B) are same relative to all CPU modules (10~40), but the time slot start count (5C) and the time slot end count (5D) may be different to each of the CPU modules (10~40).

For example, the CPU0 (10) may be set accessible to a time slot corresponding to when a time slot of CPU0 (10) is a count from zero (0) to nine, when the CPU1 (20) is a count from 20 to 29, and when the CPU2 (30) is a count from 30 to 39, at which time, the time slot start count (5C) of the CPU0 (10) may be zero (0), and the time slot end count (5D) may be 9.

The PLC system according to an exemplary embodiment of the present disclosure as illustrated in FIG. 3 may share one clock. Each CPU module (10~40) may include a detector configured to detect a clock, and each CPU modules (10~40) may generate a clock signal in response to the clock of the PLC system.

Figure 6:
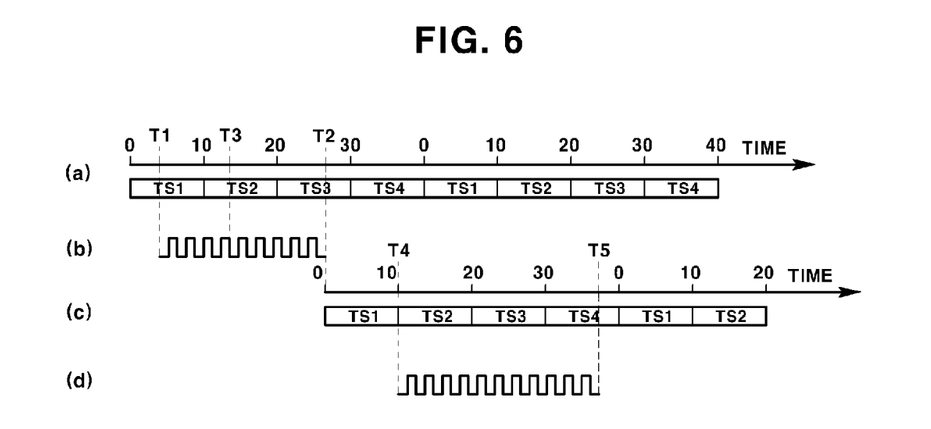
FIG. 6 is a schematic view illustrating time slots generated by CPU0 according to an exemplary embodiment of the present disclosure.

FIG. 6 is a schematic view illustrating time slots generated by CPU0 according to an exemplary embodiment of the present disclosure.

Now, referring again to the above example, as in (a), the CPU0 (10) may access to a time slot 1 (TS1), the CPU1 (20) may access to a time slot 2 (TS2), the CPU2 (30) may access to a time slot 3 (TS3), and the CPU3 (40) may access to a time slot 3 (TS4) respectively through the backplane (B).

At this time, the CPU0 (10) may access to SO_1 (11) or SO_2 (12) through the backplane (B) at a count corresponding to TS1, where the CPU0 (10) accessed to the SO_1 (11) or SO_2 (12) through the backplane (B) may generate a clock signal as in (b). It can be learned by ascertaining through each clock signal detector that the balance of CPU modules (20, 30, 40) is such that a certain arbitrary CPU module is connected to the slave module through the backplane (B) when a clock signal is present in the PLC system. That is, as in (c), the CPU0 (10) accessed at T1 count to the SO_1 (11) or SO_2 (12) through the backplane (B) may end a relevant access.

When the CPU1 (20) tries to connect to a slave module at T2 count through the backplane (B), the CPU1 (20) can ascertain a clock signal of PLC system through its clock signal detector. It can be ascertained that access at a relevant T2 count through the backplane (b) is impossible because the CPU1 (20) can ascertain a clock signal generated by the CPU0 (10) at T2 count in a PLC system, and standby in order to be accessed to a next time slot.

The CPU0 (10) may end access at T2 count and simultaneously end generation of clock signal. In this case, the CPU0 (10) of the PLC system according to the present disclosure may synchronize counts at the T2 count. That is, as in (c), count may be started again from zero (0) at a count corresponding to T2. That is, TS1 may be started again from the beginning.

However, although the exemplary embodiment of the present disclosure has illustrated and explained that the CPU module ending the access and the CPU module synchronizing the counts are same, it may be said that the CPU module synchronizing the counts is CPU0 (10) which is a master CPU module, and the CPU module ending the access corresponds to all CPU modules.

The CPU1 (20) waiting for its own order may access to a slave module through the backplane at T4 count (i.e., 10) when its own time slot is counted again after synchronization. The CPU1 (10) accessed to the slave module may generate a predetermined clock signal, where another CPU module having ascertained the clock signal does not access to the backplane (B) but may wait until its next time slot is counted.

The CPU1 (20) may access to its own slave module up to T5 count in the exemplary embodiment of the present disclosure, and albeit not being illustrated, the CPU1 (20)

may count the time slot again from the beginning by synchronizing counts again as in (c).

Thus, a standby time of other CPU modules may be reduced by synchronizing the counts at a time of ending the access by the CPU module according to the present disclosure. For example, as in (b), when counts are not synchronized even when the CPU0 (10) ends the access, the CPU1 (20) must wait for its time slot up to T6 count, but access may be enabled at T4 which is earlier than T6, whereby the standby time can be reduced.

Figure 7:
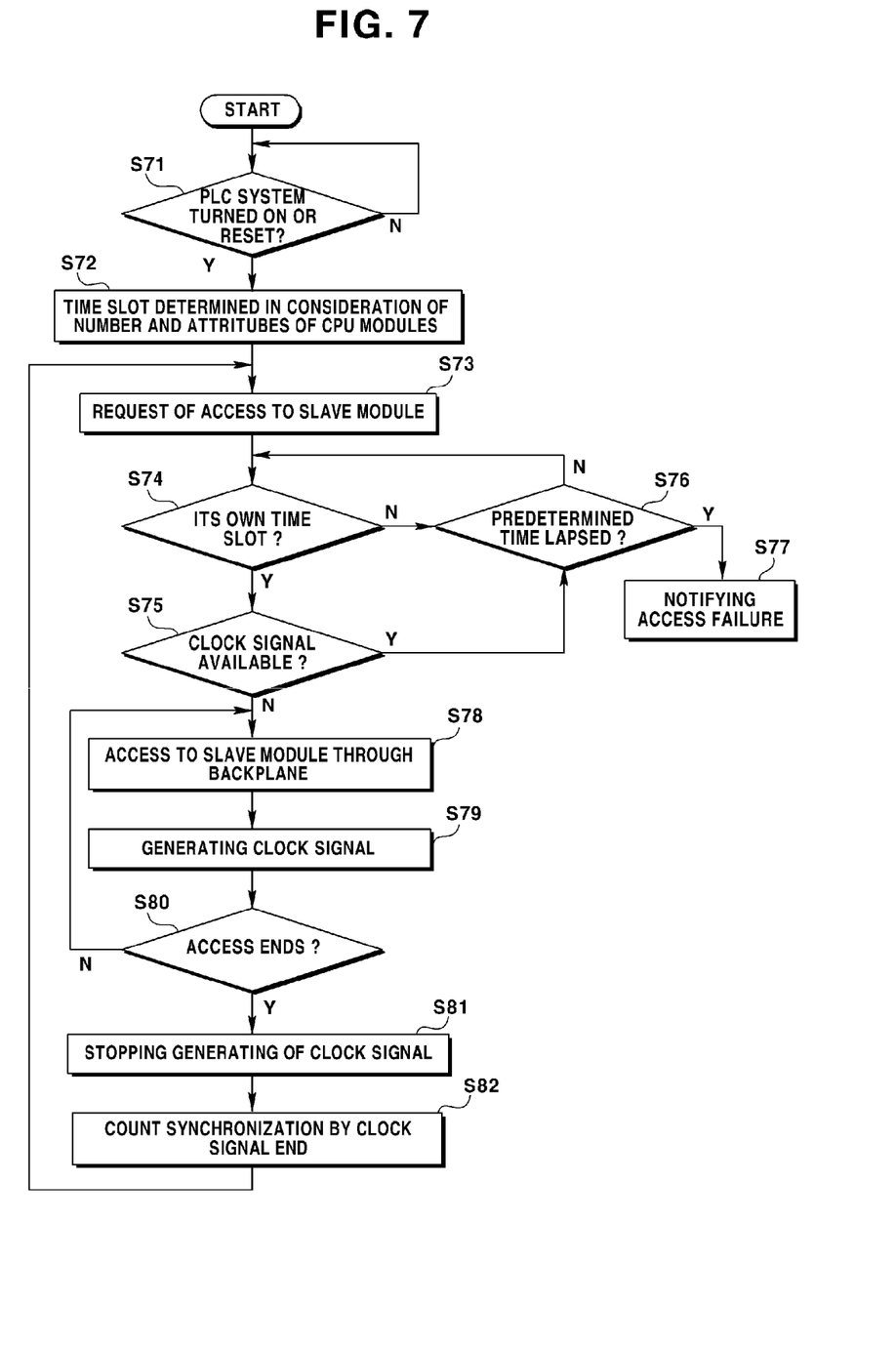
FIG. 7 is a flowchart illustrating a method for controlling a PLC system according to the present disclosure.

FIG. 7 is a flowchart illustrating a method for controlling a PLC system according to the present disclosure.

Referring to FIG. 7, the CPU0 (10) which is a master module in the PLC system according to the present disclosure may determine time slot configured to determine a count accessible, by each CPU module, to a slave module through the backplane (B) in consideration of the number and attributes of the CPU modules when the PLC system is turned on or reset (S71). At this time, the CPU0 (10) may determine the time slot maximum count (5A), the time slot current count (5B), the time slot start count (5C) to each CPU module, and the time slot end count (5D) and transmit to each CPU module.

Thereafter, consider a case where a CPU module, e.g., the CPU1 (20), required for access from a slave module. However, it should be apparent that operations of the present disclosure are not limited to the CPU1 (20) only, and may be applicable to other CPU modules.

The CPU1 (20) may ascertain if a current count is a count corresponding to its own time slot when there is a request of access from S1_1 (21) or S1_2 (22) (S73). That is, the CPU1 (20) may ascertain if the current count corresponds to 10 to 20 count in FIG. 6 (S74)

As a result of S74, if it is determined that the count is not its own time slot, the CPU1 (20) may wait for a predetermined time to a time corresponding to its own time slot (S76). The CPU1 (20) may notify that access has failed (S77) when not reaching a count corresponding to its own time slot even if a predetermined time has lapsed As a result of S74, if it is determined that the count is its own time slot, that is, when the current count corresponds to 10 to 20 count, the CPU1 (20) may ascertain if a clock signal is available (S75). The generation of a current clock signal may be confirmed by detection by a clock signal detector included in the CPU1 (20). That is, for example, when the CPU2 (30) accesses through the backplane (B) at a current count, the CPU2 (30) may generate a current count, where the clock signal detector of the CPU1 (20) may confirm the generation of the current count, the CPU1 (20) may determine that it is impossible to access to the backplane (B) at a current count, and may wait for a predetermined time to correspond to a next its own time slot (S76). The CPU1 (20) may notify that the access has failed when not reaching a count corresponding to its own time slot even if a predetermined time has lapsed (S77).

The CPU1 (20) may access to S1_1 (21) or S1_2 (22) through the backplane (B) when there is no clock signal generated in correspondence to its own time slot (S78). At the same time, the CPU1 (20) may generate a clock signal and notify that it accesses to a slave module through the backplane (B) (S79). Although S78 and S79 are illustrated in a sequential relationship, which is for convenience sake, and it should be apparent that S78 and S79 are of a simultaneously-performed relationship. However, it should be apparent that the present disclosure is not limited to only a case where the generation of clock signal of the CPU1 (20) is simultaneously performed along with a slave module through the backplane (B). The generation of clock signal at S79 may be continuously performed for a time when accessed to the slave module through the backplane (B).

Successively, the CPU1 (20) stops generation of clock signal (S81) at the same time when the access ends (S80), and the CPU0 (10) in the PLC system may synchronize counts at a time of ending the clock signal and transmit the synchronized counts to each CPU module (S81).

The exemplary embodiments of the present disclosure have advantageous effects in that collision can be avoided by ascertaining (checking or confirming) whether other CPU modules are connected even if corresponding to a time slot of CPU module itself, and a master CPU module synchronizes counts at a time of ending, by a certain CPU module, an access to a slave module to thereby reduce a standby time for access.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

INDUSTRIAL APPLICABILITY

The exemplary embodiments of the present disclosure have an industrial applicability in that collision can be avoided by ascertaining (checking or confirming) whether other CPU modules are connected even if corresponding to a time slot of CPU module itself, and a master CPU module synchronizes counts at a time of ending, by a certain CPU module, an access to a slave module to thereby reduce a standby time for access.

The invention claimed is:

1. A PLC (Programmable Logic Controller) system comprising:
   a first CPU module configured to determine a time slot allocated for indicating a time accessible to a backplane, to ascertain a clock signal, and to access to the backplane at the allocated time slot and there is no clock signal; and
   a plurality of second CPU modules respectively accessing to the backplane at the time slot allocated by the first CPU module,
   wherein the first CPU module ascertains number and attributes of the first CPU module and the plurality of the second CPU modules when the PLC system is turned on or reset, to set the time slot accessible by each of the first CPU module and the plurality of second CPU modules,
   wherein the first CPU module or one of the plurality of the second CPU modules generates the clock signal when accessed to the backplane,
   wherein each of the first CPU module and the plurality of the second CPU modules includes a detector configured to detect the clock signal generated by the first CPU module or the one of the plurality of the second CPU modules accessed to the backplane, and
   wherein the first CPU module synchronizes counts of time slots of the first CPU module and the plurality of the second modules to zero(0) at a time when the first CPU module or the one of the plurality of the second CPU modules accessed to the backplane ends generating the clock signal.

2. The PLC system of claim 1, wherein the first CPU module or one of the plurality of the second CPU modules trying to access to the backplane does not access to the backplane when the clock signal is detected by the detector.

3. The PLC system of claim 1, wherein the first CPU module transmits a time slot maximum count, a time slot current count, a time slot start count and a time slot end count to the plurality of second CPU modules.

4. A control method of PLC (Programmable Logic Controller) system having a plurality of CPU modules, the method comprising:
   determining a time slot allocated for indicating a time accessible to a backplane;
   ascertaining a clock signal when current time is the time corresponding to the allocated time slot;
   accessing to the backplane, when the current time is the time corresponding to the allocated time slot and there is no clock signal, and generating the clock signal at a time of accessing to the backplane; and
   stopping generation of the clock signal at the same time when the access to the backplane ends, and synchronizing counts of time to zero(0) at a time of ending the clock signal, and
   ascertaining number and attributes of the plurality of CPU modules when the PLC system is turned on or reset, to set the time slot accessible by each of the plurality of CPU modules.

5. The method of claim 4, further comprising not accessing to the backplane when the clock signal is detected at the time corresponding to the allocated time slot.

6. The method of claim 5, further comprising waiting for accessing to the backplane at a time slot of next count.

7. The method of claim 4, further comprising ending generation of the clock signal at a time when the access to the backplane ends.

8. The method of claim 4, wherein the time slot is determined in consideration of the number and attributes of the plurality of CPU modules which are connected to the backplane.

9. A control method of PLC (Programmable Logic Controller) system having a plurality of CPU modules, the method comprising:
   ascertaining a clock signal when a current time is a time corresponding to a time slot allocated by a master CPU module of the plurality of CPU modules;
   accessing to a backplane, when the current time is the time corresponding to the allocated time slot and there is no clock signal, and generating the clock signal by one of the plurality of CPU modules accessed to the backplane;
   and ending generation of the clock signal at a time when the access to the backplane ends by the one of the plurality of CPU modules accessed to the backplane and synchronizing, by the master CPU module, the counts of the time to zero(0) at a time of ending generation of the clock signal, and
   ascertaining number and attributes of the plurality of CPU modules when the PLC system is turned on or reset, to set the time slot accessible by each of the plurality of CPU modules.

10. The method of claim 9, further comprising not accessing to the backplane when the clock signal is detected at the time corresponding to the allocated time slot.

11. The method of claim 10, further comprising waiting for accessing to the backplane at a time slot of a next count.

* * * * *